United States Patent
Narahara et al.

(10) Patent No.: US 10,526,020 B2
(45) Date of Patent: Jan. 7, 2020

(54) SIDE BODY STRUCTURE OF VEHICLE

(71) Applicant: Mazda Motor Corporation, Aki-gun, Hiroshima (JP)

(72) Inventors: Takashi Narahara, Hiroshima (JP); Shuichi Nakagami, Higashihiroshima (JP); Hiroshi Matsubara, Hiroshima (JP); Katsuhisa Miyoshi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/490,163

(22) Filed: Apr. 18, 2017

(65) Prior Publication Data

US 2017/0313358 A1    Nov. 2, 2017

(30) Foreign Application Priority Data

Apr. 28, 2016   (JP) ................... 2016-090540

(51) Int. Cl.
  *B62D 25/04*  (2006.01)
  *B62D 25/02*  (2006.01)

(52) U.S. Cl.
  CPC .......... *B62D 25/04* (2013.01); *B62D 25/025* (2013.01)

(58) Field of Classification Search
  CPC ............................. B62D 25/04; B62D 25/025
  USPC ................................... 296/187.12
  See application file for complete search history.

(56) References Cited

U.S. PATENT DOCUMENTS

| | | | |
|---|---|---|---|
| 2013/0200650 A1* | 8/2013 | Matsuoka | B62D 21/155 296/187.1 |
| 2015/0145286 A1* | 5/2015 | Saje | B22D 17/00 296/193.06 |
| 2015/0344071 A1 | 12/2015 | Nakano et al. | |
| 2015/0375800 A1* | 12/2015 | Wagner | B62D 29/046 296/187.03 |
| 2017/0088184 A1* | 3/2017 | Emura | B62D 21/157 |

FOREIGN PATENT DOCUMENTS

| | | |
|---|---|---|
| CN | 102582551 A | 7/2012 |
| CN | 203142798 U | 8/2013 |
| CN | 205010328 U | 2/2016 |
| EP | 1256509 A2 | 11/2002 |
| JP | 2002347654 A | 12/2002 |
| JP | 2004216956 A | 8/2004 |
| JP | 2010111140 A | 5/2010 |
| JP | 2013159290 A | 8/2013 |
| JP | 2015229384 A | 12/2015 |
| WO | 2015146903 A1 | 10/2015 |

\* cited by examiner

*Primary Examiner* — Joseph D. Pape
*Assistant Examiner* — Dana D Ivey
(74) *Attorney, Agent, or Firm* — Alleman Hall Creasman & Tuttle LLP

(57) ABSTRACT

A side body structure of a vehicle is provided, which includes a hinge pillar extending in vertical directions of the vehicle, a hinge reinforcement disposed in the hinge pillar, and a reinforcing member disposed in the hinge pillar and extending in the vertical directions. The hinge reinforcement is provided with an overlapping section provided on a rear side of a portion of the reinforcing member and overlapping in the vertical directions with the portion when viewed from a vehicle front side.

4 Claims, 13 Drawing Sheets

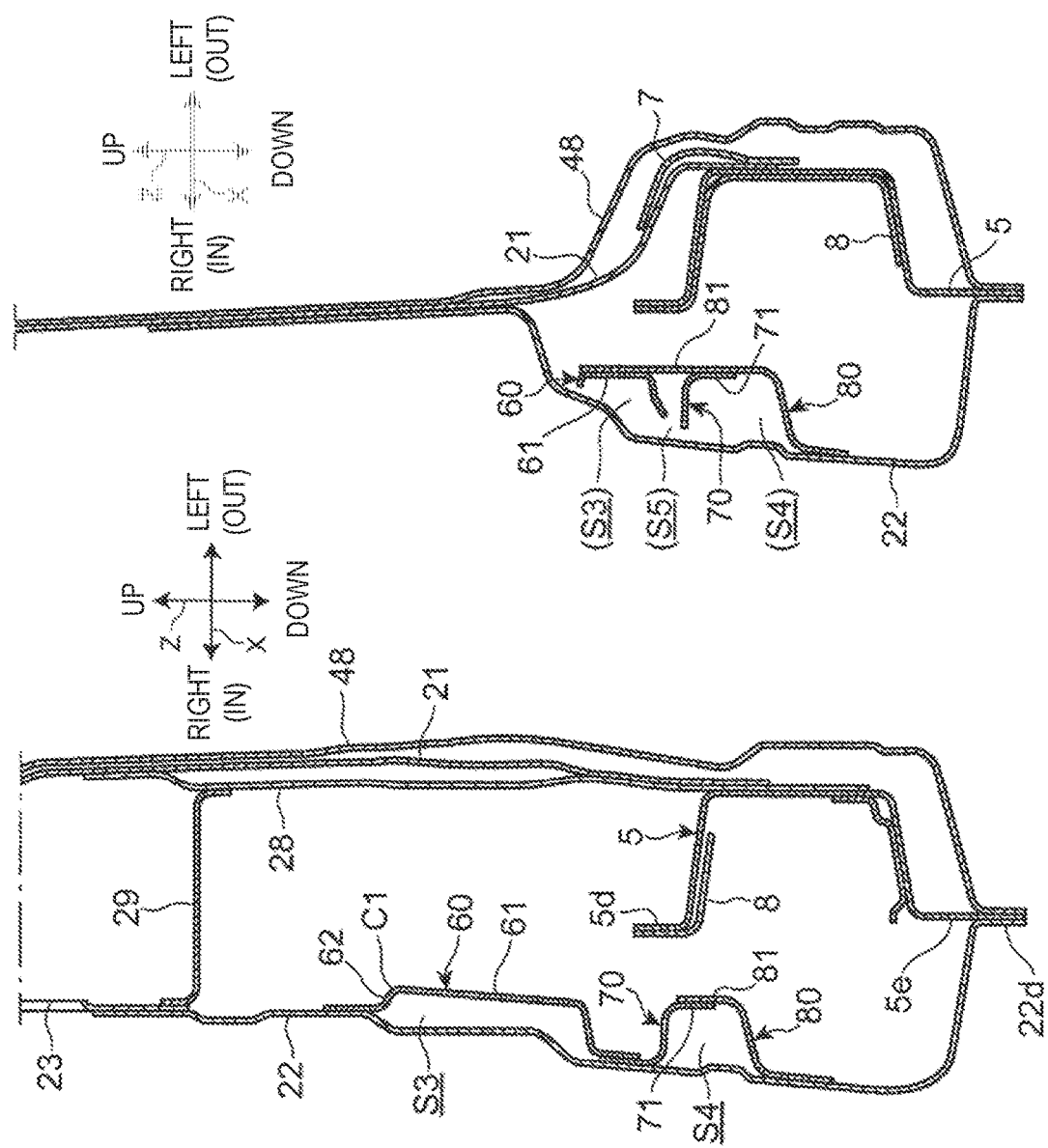

SIDE BODY STRUCTURE OF VEHICLE

BACKGROUND

The present invention relates to a body structure of a vehicle, and particularly relates to a side body structure of a vehicle in a hinge pillar, and a part therearound.

Generally, when a vehicle experiences a frontal collision, a pair of left and right front-side frames provided in a front part of the vehicle extending in vehicle longitudinal directions, crashes and absorbs the impact load, and via the front-side frames, distributes the impact load to various vehicle parts, in order to reduce cabin deformation.

When a so-called small overlap collision where the vehicle overlaps with a collision object at an outer side of the front-side frame in vehicle width directions occurs, a front wheel in the overlapped area may move rearwardly (retreat) with respect to the vehicle body and the impact load may be applied from the front wheel to a hinge pillar extending in a vehicle vertical direction.

The applied impact load is distributed rearwardly via structures, such as a side sill extending rearwardly from a lower end of the hinge pillar, a front pillar extending upwardly and rearwardly from an upper end of the hinge pillar, and an impact bar of a front door attached near the hinge pillar. The distribution of the load from the hinge pillar to various parts on the rear side reduces the retreating of the hinge pillar and a dashboard and, as a result, reduces the cabin deformation.

Generally, the hinge pillar is continuously formed with a closed section space extending vertically between the inner and outer hinge pillar members, and thus, a suitable load transmission occurs between the lower end and the upper end of the hinge pillar. Further, the side sill is continuously formed with a closed section space extending in the vehicle longitudinal directions, and thus, a suitable rearward load transmission via the side sill is achieved.

Here, if buckling occurs in a front end part of the side sill due to a frontal impact load applied to the hinge pillar, the load cannot effectively be distributed rearwardly via the side sill.

Regarding this inconvenience, JP2013-159290A discloses a structure in which an inner reinforcing member extending in vehicle longitudinal directions is disposed inside a connecting part between a lower end part of a hinge pillar and a front end part of a side sill to form another closed section space. It is considered that the bucking of the front end part of the side sill is reduced in this structure. According to this structure of JP2013-159290A, an impact load is effectively distributed rearwardly via the side sill extending rearwardly from the lower end part of the hinge pillar.

Although the frontal impact load applied to the hinge pillar of the conventional vehicle is distributed rearwardly via the side sill, the front pillar, and the impact bar of the front door as described above, there still is room for improvement in the side body structure provided to such a conventional vehicle, in order to distribute the load rearwardly more stably.

SUMMARY

The present invention is made in view of the above issues and aims to provide a side body structure of a vehicle, which effectively distributes a frontal impact load applied to a hinge pillar to a vehicle rear side.

According to one aspect of the present invention, a side body structure of a vehicle is provided, which includes a hinge pillar extending in vertical directions of the vehicle, a hinge reinforcement disposed in the hinge pillar, and a reinforcing member disposed in the hinge pillar and extending in the vertical directions. The hinge reinforcement is provided with an overlapping section provided on a rear side of a portion of the reinforcing member and overlapping in the vertical directions with the portion when viewed from a vehicle front side.

According to the above structure, when an impact load is applied to a part of the hinge pillar where the reinforcing member is provided in the vertical directions (hereinafter, this part is referred to as "the reinforced part of the hinge pillar"), since the reinforcing member extending in the vertical directions is disposed in the hinge pillar, a rigidity of the hinge pillar is increased by the reinforcing member so that bending of the hinge pillar due to the impact load is reduced.

Especially since the hinge reinforcement is provided with the overlapping section provided on the rear side of the portion of the reinforcing member and overlapping in the vertical directions with the portion when viewed from the vehicle front side, when the reinforcing member receives a frontal impact load applied to the reinforced part of the hinge pillar, it collapses rearwardly together with the reinforced part due to a moment generated by the impact load. Then, the portion of the reinforcing member is displaced rearwardly in relation to the hinge reinforcement, and contacts with the overlapping section of the hinge reinforcement and a part therearound. Thus, the hinge reinforcement functions as the support of the hinge pillar and the reinforcing member, and the hinge pillar is prevented from collapsing further rearwardly. Further, the contact between the reinforcing member and the hinge reinforcement allows the impact load to be transmitted from the hinge pillar to the hinge reinforcement via the reinforcing member, and further rearwardly via a front pillar extending upwardly and rearwardly from an upper end of the hinge pillar, and an impact bar of a front door attached near the hinge pillar.

In this manner, by using the reinforcing member capable of reducing the bending of the hinge pillar, a deformation of a cabin due to the hinge pillar collapsing is reduced while distributing the frontal impact load effectively rearwardly applied to the reinforced part of the hinge pillar.

The hinge reinforcement may have a base surface part fixed to the hinge pillar and a side wall part extending inwardly in width directions of the vehicle from the base surface part. The overlapping section may include the side wall part.

According to the above structure, when the reinforcing member receives the impact load, it collapses rearwardly together with the reinforced part of the hinge pillar, and the portion of the reinforcing member is displaced rearwardly in relation to the hinge reinforcement and contacts with the side wall part of the hinge reinforcement and a part therearound. Thus, the frontal impact load transmitted to the reinforced part is transmitted from the hinge pillar to the side wall part of the hinge reinforcement and then to the base surface part via the reinforcing member, and further transmitted rearwardly from the base surface part via the front pillar and the impact bar. In this manner, the cabin deformation is reduced while distributing the frontal impact load effectively rearwardly.

The hinge reinforcement may have an edge part extending forwardly from one end of the side wall part on the inner side in the width directions. The overlapping section may include the edge part.

According to the above structure, when the reinforcing member receives the impact load, it collapses rearwardly together with the reinforced part of the hinge pillar, and the portion of the reinforcing member is displaced rearwardly in relation to the hinge reinforcement and contacts with the edge part of the hinge reinforcement and a part therearound. Thus, the frontal impact load applied to the reinforced part is transmitted from the hinge pillar to the side wall part or the edge part of the hinge reinforcement and then to the base surface part via the reinforcing member, and further transmitted rearwardly from the base surface part via the front pillar and the impact bar. In this manner, the cabin deformation is reduced while distributing the frontal impact load effectively rearwardly.

The side body structure may further include a side sill extending in longitudinal directions of the vehicle and connected to the hinge pillar. The reinforcing member may be partially fixed to the side sill.

According to the above structure, the frontal impact load applied to the hinge pillar is transmitted rearwardly via the side sill connected to the hinge pillar. Especially since a part of the reinforcing member is fixed to the side sill, part of the impact load applied to the reinforced part of the hinge pillar is transmitted from the hinge pillar to the side sill via the reinforcing member, and further transmitted rearwardly. In this manner, the rearward transmission of the impact load is effectively achieved.

The reinforcing member may be partially fixed to the hinge pillar and an upper part thereof is free from being fixed to the hinge pillar. The overlapping section may be located on the rear side of an upper end part of the reinforcing member and overlap in the vertical directions with the upper end part when viewed from the vehicle front side.

Here, the reinforced part of the hinge pillar is a part of the hinge pillar where the reinforcing member is fixed in the vertical directions.

According to the above structure, a part of the reinforcing member fixed to the hinge pillar contributes an increase of a rigidity of the hinge pillar against the impact load applied thereto. Thus, when the reinforcing member receives the impact load applied to the reinforced part of the hinge pillar, although it collapses rearwardly together with the hinge pillar, a part of the hinge pillar near the upper end part or a part therearound does not collapse, or collapses less. As a result, when the frontal impact load is applied to the reinforcing part of the hinge pillar, the upper end part of the reinforcing member is displaced rearwardly in relation to the hinge reinforcement, and contacts with the overlapping section of the hinge reinforcement located on the rear side of the upper end part and a part therearound. In this manner, the cabin deformation is reduced while distributing the frontal impact load effectively rearwardly.

According to another aspect of the present invention, a side body structure of a vehicle is provided, which includes a hinge pillar extending in vertical directions of the vehicle, a hinge reinforcement disposed in the hinge pillar, and a reinforcing member disposed in the hinge pillar and extending in the vertical directions, the reinforcing member being provided with a contacting section for contacting with the hinge reinforcement upon receiving a load applied from a vehicle front side to a part of the hinge pillar where the reinforcing member is provided in the vertical directions.

According to the above structure, when an impact load is applied the reinforced part of the hinge pillar, since the reinforcing member extending in the vertical directions is disposed in the hinge pillar, a rigidity of the hinge pillar is increased by the reinforcing member so that bending of the hinge pillar due to the impact load is reduced.

Especially, since the contacting section is provided so as to contact with the hinge reinforcement upon receiving an impact load applied from the front side to the reinforcing member, when the reinforcing member receives the impact load, it collapses rearwardly together with the reinforced part due to a moment generated by the impact load. Then, the contacting section of the reinforcing member is displaced rearwardly in relation to the hinge reinforcement, and the portion contacts with the hinge reinforcement and a part therearound. Thus, the hinge reinforcement functions as the support of the hinge pillar and the reinforcing member, and the hinge pillar is prevented from collapsing further rearwardly. Further, the contact between the reinforcing member and the hinge reinforcement allows the impact load to be transmitted from the hinge pillar to the hinge reinforcement via the reinforcing member. Then the impact load is further transmitted rearwardly via a front pillar extending upwardly and rearwardly from an upper end of the hinge pillar, and an impact bar of a front door attached near the hinge pillar.

In this manner, by using the reinforcing member capable of reducing the bending of the hinge pillar, deformation of a cabin due to the hinge pillar collapsing is reduced while distributing the frontal impact load effectively rearwardly applied to the reinforced part of the hinge pillar.

The reinforcing member may have an extended part extending inwardly in width directions of the vehicle from an upper end part. The overlapping section may be located on a rear side of the extended part and overlap in the vertical directions with the extended part when viewed from the vehicle front side.

BRIEF DESCRIPTION OF THE DRAWINGS

FIGS. 15A to 15C show front cross-sectional views illustrating the first to third inner reinforcements and parts therearound, taken along lines C-C, D-D, and E-E of FIG. 3, respectively.

DETAILED DESCRIPTION OF EMBODIMENT

Figure 1:
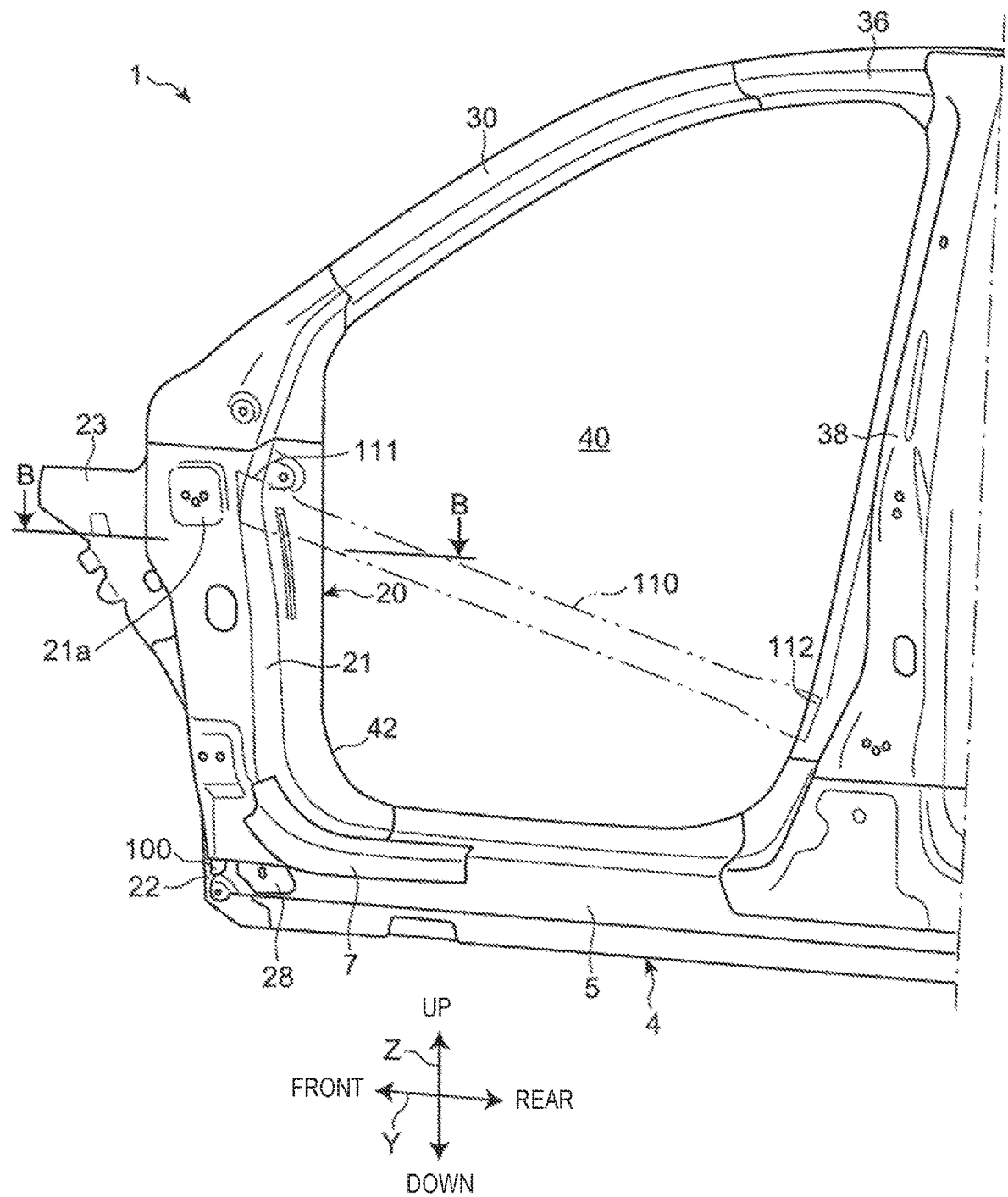
FIG. 1 is a perspective view illustrating a side body structure of a vehicle according to one embodiment of the present invention.

Hereinafter, a side body structure of a vehicle according to one embodiment of the present invention is described with reference to the accompanying drawings. Note that in the following description, words indicating directions, such as "front side" ("forward"), "rear side" ("rearward(ly)"), "left side" ("leftward(ly)"), "right side" ("rightward(ly)"), "upper side" ("upward(ly)"), and "lower side" ("downward(ly)"), indicate directions defined by having a forward traveling direction of the vehicle as "front," unless otherwise defined. Further in the drawings, the reference character "X" indicates vehicle width (lateral) directions, the reference character "Y" indicates vehicle longitudinal directions, and the reference character "Z" indicates vehicle height (vertical) directions. In the following description, the phrases "inner side" and "inward(ly)" indicate directions toward a center of the vehicle in the vehicle lateral directions and the phrases "outer side" and "outward(ly)" indicate directions away from the center in the vehicle lateral directions, unless otherwise defined. Moreover, the phrases "lateral directions" and "lateral(ly)" indicate the vehicle lateral directions and the phrases "longitudinal directions" and "longitudinal(ly)" indicate the vehicle longitudinal directions, unless otherwise defined.

I. Overall Structure

FIG. 1 is a perspective view illustrating a left side body of an automobile (vehicle) 1 having the side body structure of this embodiment. Note that in FIG. 1, a cabin side outer 48 (see FIG. 4 etc.) constituting a surface of a side body part of the vehicle is omitted.

As illustrated in FIG. 1, the vehicle 1 includes side sills 4 extending longitudinally, and hinge pillars 20 extending vertically. A lower end part of each hinge pillar 20 is connected to a front end part of the side sill 4. The hinge pillar outer 21 constituting an outer member of the hinge pillar 20 has a side surface part 21a having a concave portion dented outwardly and on which a base surface part 51 of a hinge reinforcement 50 (described later) is disposed.

The side sills 4 are provided in left and right side parts of a vehicle body, and a floor panel (not illustrated) is built between the left and right side sills 4. The hinge pillars 20 are also provided in the left and right side parts of the vehicle body, and a dashboard (not illustrated) is built to extend laterally from the left hinge pillar 20 to the right hinge pillar 20.

Further as illustrated in FIG. 1, the vehicle 1 includes a front pillar 30 extending obliquely upwardly and rearwardly from an upper end part of each hinge pillar 20, a roof rail 36 extending rearwardly from an upper end part of the front pillar 30, and a center pillar 38 vertically extending from the roof rail 36 to the side sill 4.

The side body part of the vehicle 1 is formed with a front door opening 40 surrounded by an upper edge of the side sill 4, a rear edge of the hinge pillar 20, a rear edge of the front pillar 30, a lower edge of the roof rail 36, and a front edge of the center pillar 38. A curved corner 42 is formed in a circumferential edge of the door opening 40, between a lower end portion of the rear edge of the hinge pillar 20 and a front end portion of the upper edge of the side sill 4.

The door opening 40 is covered by a door body (not illustrated) to be openable. The door body is provided with an impact bar 110 extending longitudinally and for absorbing an impact load caused by a side collision. The impact bar 110 inclines so that a front end part 111 is located higher than a rear end part 112. The front end part 111 of the impact bar 110 is attached to an impact bar attaching surface (not illustrated) which is provided to a rear end part of a hinge unit including a hinge member 120 (see FIGS. 8 and 10). The rear end part 112 of the impact bar 110 is attached to an impact bar attaching surface (not illustrated) provided to a rear edge part of the door body.

II. Structure Inside Hinge Pillar 20

Hinge Pillar 20

Figure 3:
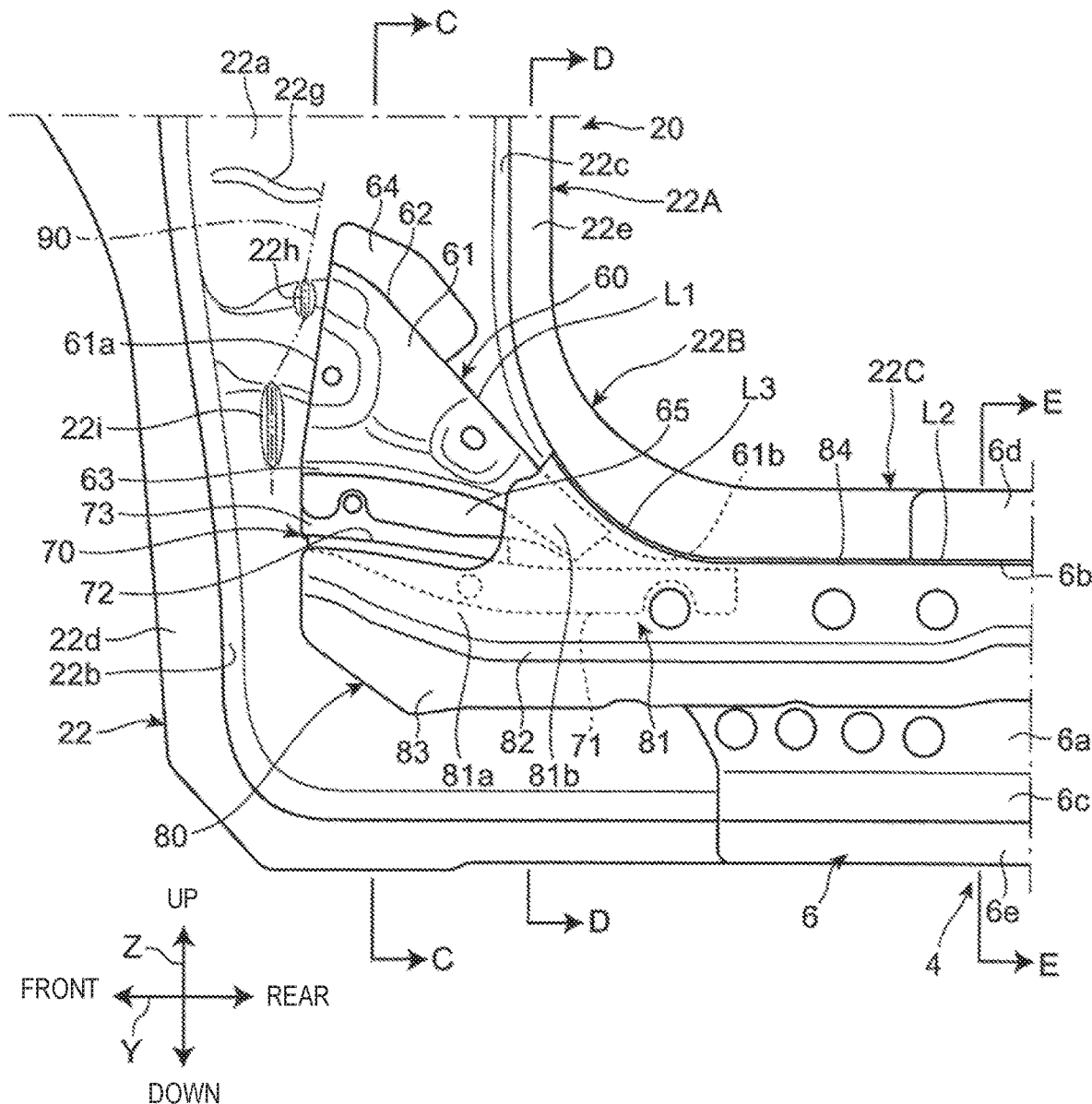
FIG. 3 is a side view illustrating the inner part of the internal structure of the hinge pillar and the side sill.
Figure 4:
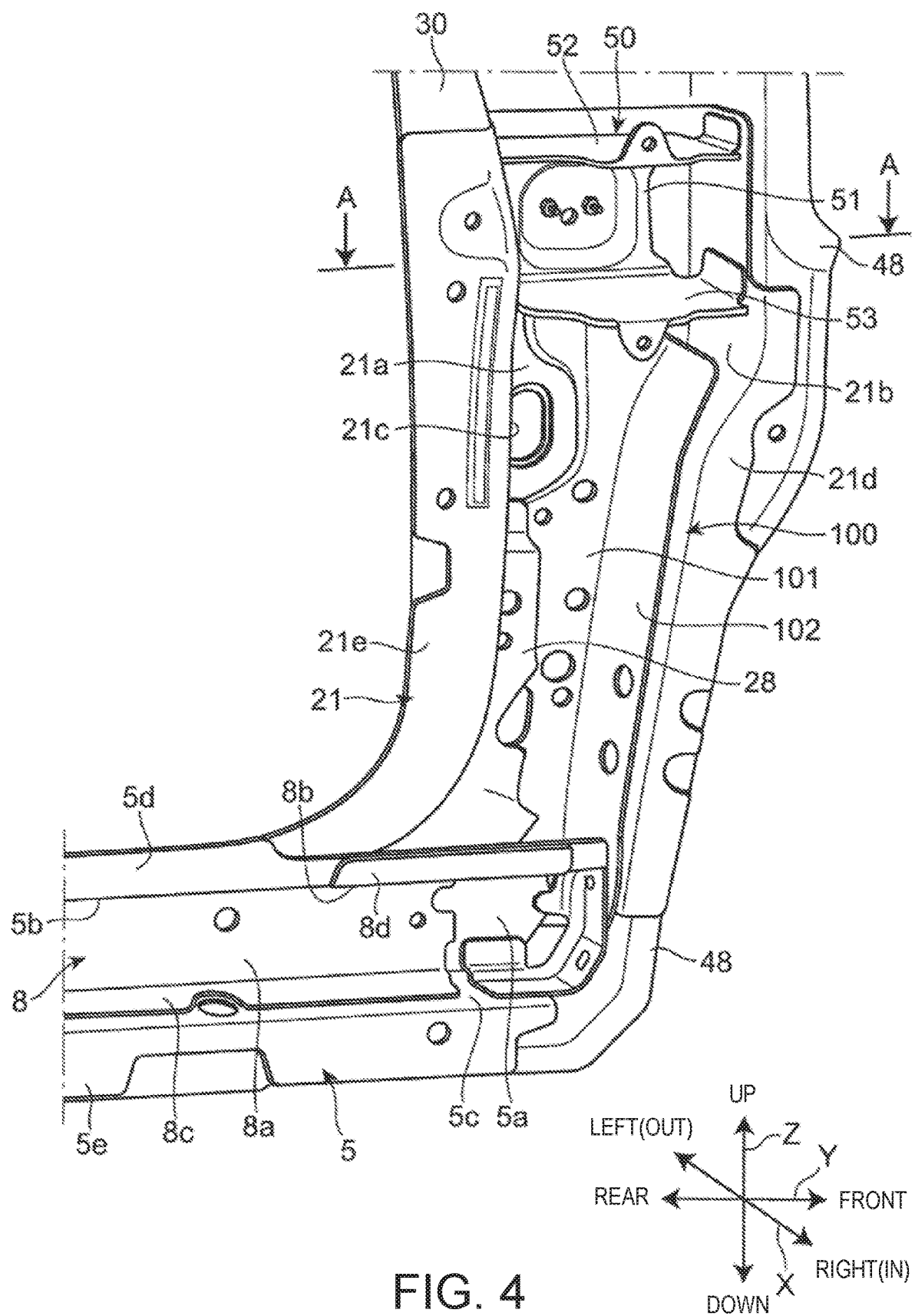
FIG. 4 is a perspective view illustrating an outer part of the internal structure of the hinge pillar and the side sill.
Figure 5:
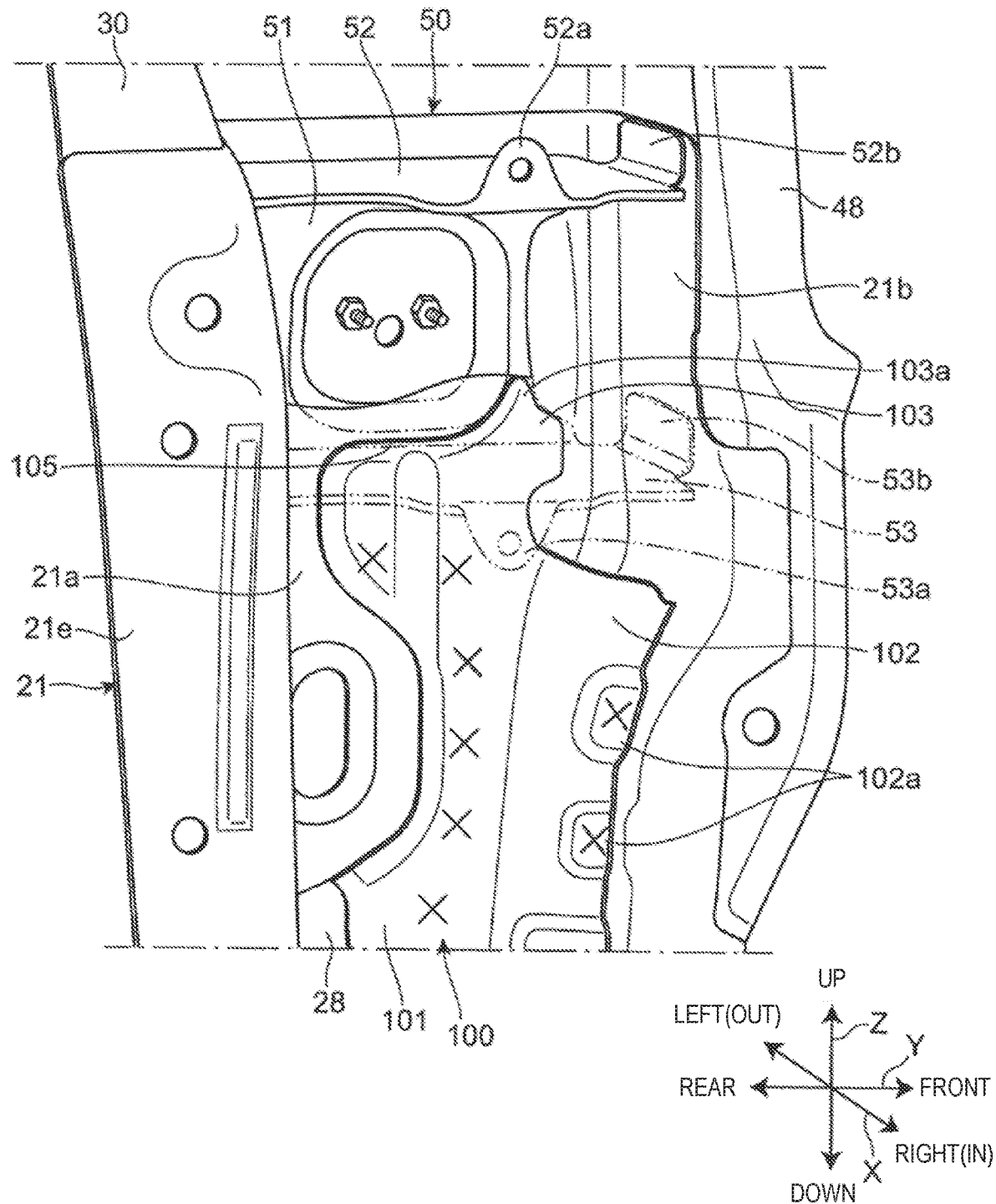
FIG. 5 is a partial enlarged view of FIG. 4.

The hinge pillar 20 includes a hinge pillar outer 21 illustrated in FIGS. 4 and 5, having a hat-shaped cross section opening inwardly. The hinge pillar 20 also includes a lower hinge pillar inner 22 and an upper hinge pillar inner 23 illustrated in FIGS. 2 and 3, having a hat-shaped cross section opening outwardly. The lower and upper hinge pillar inners 22 and 23 constitute inner members of the hinge pillar 20.

Figure 2:
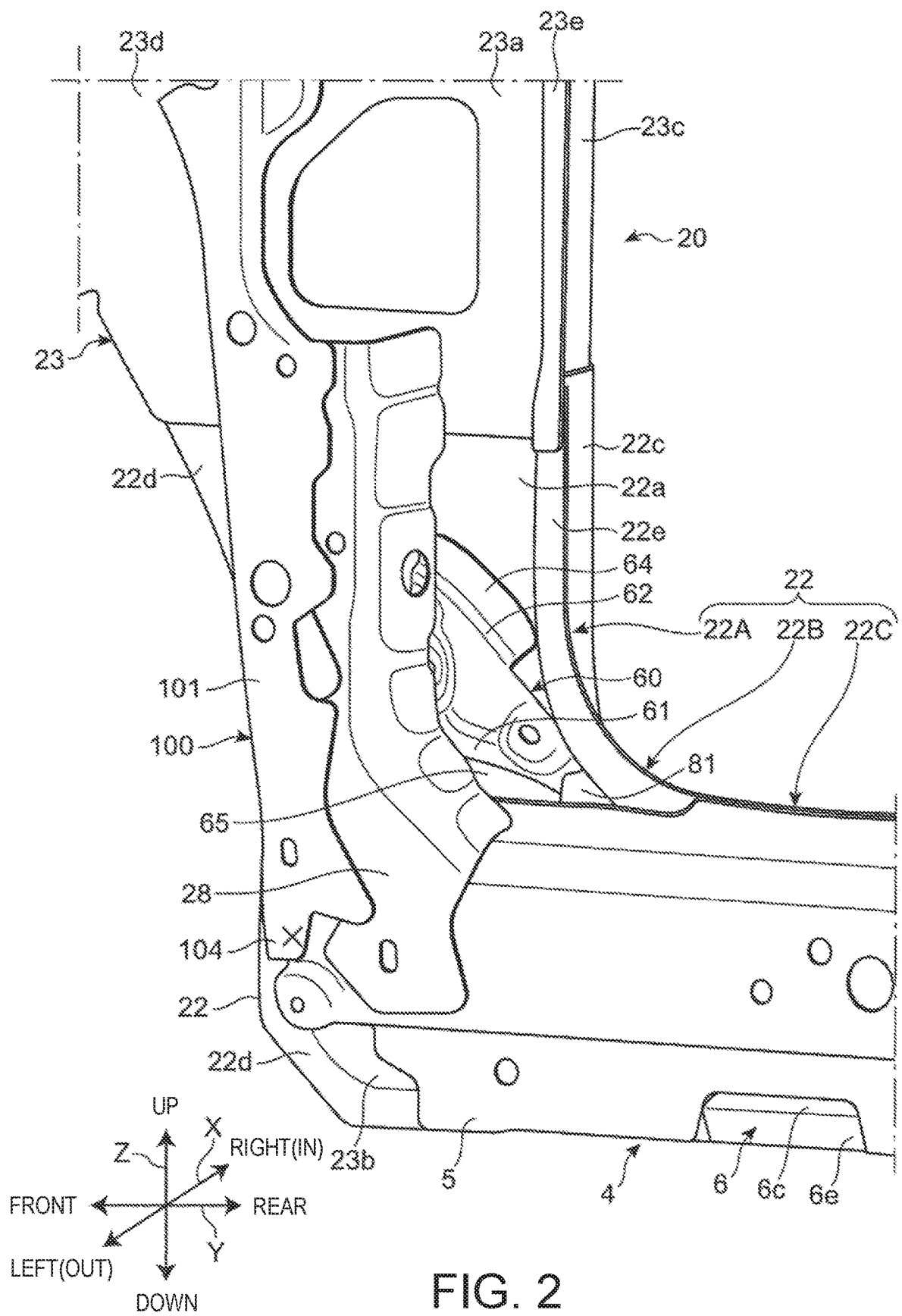
FIG. 2 is a perspective view illustrating an inner part of an internal structure of a hinge pillar and a side sill.
Figure 6:
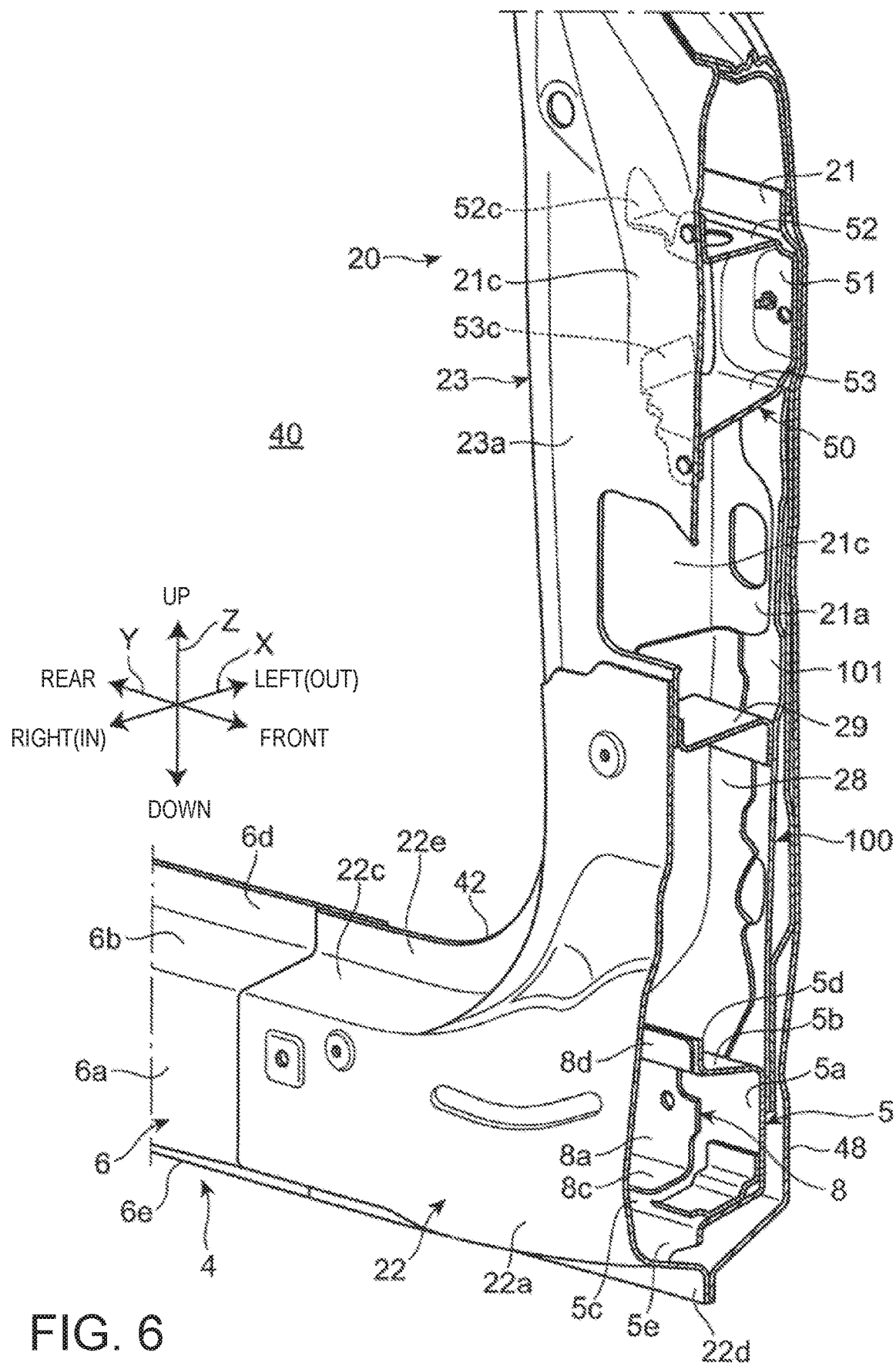
FIG. 6 is a partially-broken front perspective view illustrating the hinge pillar and an inside thereof, viewed from an inner side in vehicle lateral directions.

As illustrated in FIGS. 2 and 6, the lower and upper hinge pillar inners 22 and 23 are disposed vertically continuously to each other, and an upper end part of the lower hinge pillar inner 22 is joined to a lower end part of the upper hinge pillar inner 23.

The lower and upper hinge pillar inners 22 and 23 include side surface parts 22a and 23a constituting an inner surface of the hinge pillar 20, front surface parts 22b and 23b constituting a front surface of the hinge pillar 20, rear surface parts 22c and 23c constituting a rear surface of the hinge pillar 20, first flanges 22d and 23d provided at outer edges of the front surface parts 22b and 23b, and second flanges 22e and 23e provided to outer edges of the rear surface parts 22c and 23c, respectively.

The lower hinge pillar inner 22 has a pillar structure 22A extending vertically and constituting the lower end part of the hinge pillar 20, a curve structure 22B curving obliquely downwardly and rearwardly from a lower end of the pillar structure 22A, and a rear elongated structure 22C extending rearwardly from a rear end of the curve structure 22B. The curve structure 22B constitutes the part connecting the lower end part of the hinge pillar 20 and the front end part of the side sill 4 to each other. The rear elongated structure 22C constitutes a part of the side sill 4 and is joined at a rear end to a front end of a side sill inner 6 (described later).

The pillar structure 22A, the curve structure 22B, and the rear elongated structure 22C of the lower hinge pillar inner 22 extend integrally. Each of the side surface part 22a, the front surface part 22b, the rear surface part 22c, and the first and second flanges 22d and 22e constituting the lower hinge pillar inner 22 is formed continuously over the pillar structure 22A, the curve structure 22B, and the rear elongated structure 22C. The front surface part 22b constitutes lower surface parts of the curve structure 22B and the rear elongated structure 22C, and the rear surface part 22c constitutes upper surface parts of the curve structure 22B and the rear elongated structure 22C.

As illustrated in FIG. 4, the hinge pillar outer 21 includes a side surface part 21a constituting an outer surface of the hinge pillar 20, a front surface part 21b constituting the front surface of the hinge pillar 20, a rear surface part 21c constituting the rear surface of the hinge pillar 20, a first flange 21d provided to an inner edge of the front surface part 21b, and a second flange 21e provided to an inner edge of the rear surface part 21c.

As illustrated in FIGS. 2 to 4, the hinge pillar outer 21 is disposed on the outer side of the lower and upper hinge pillar inners 22 and 23, opposing thereto. The hinge pillar outer 21 is joined to the lower and upper hinge pillar inners 22 and 23 by joining the first flanges 21d, 22d and 23d and joining the second flanges 21e, 22e and 23e.

Figure 11:
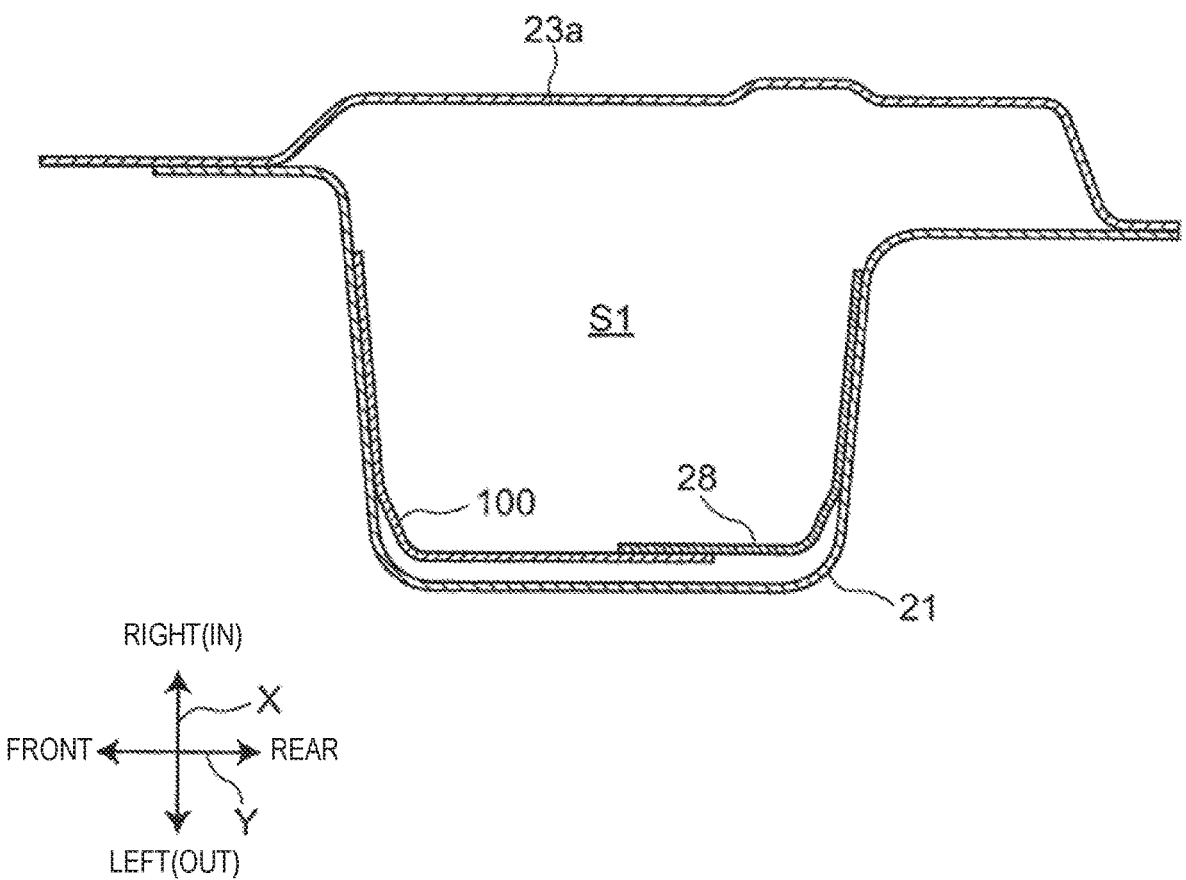
FIG. 11 is a top cross-sectional view illustrating the inside of the hinge pillar taken along a line B-B of FIG. 1.

Thus, a closed section space S1 is formed vertically continuously by the hinge pillar outer 21 and the lower and upper hinge pillar inners 22 and 23 (see FIG. 11). Hereinafter, this closed section space is referred to as "the closed section space S1 of the hinge pillar 20."

As illustrated in FIGS. 4 and 5, an upper end part of the hinge pillar outer 21 is located on the inner side of the front pillar 30 and fixedly joined to the front pillar 30 by, for example, spot welding.

Hinge Reinforcement 50

As illustrated in FIGS. 4 to 6, a hinge reinforcement 50 is disposed in a space inside the hinge pillar 20 defined by the hinge pillar outer 21 and the lower and upper hinge pillar inners 22 and 23. The hinge reinforcement 50 has a higher rigidity than the hinge pillar outer 21 and the upper hinge pillar inner 23. Note that rigidities of panel members described in this specification are suitably set by adjusting a plate thickness, material, etc.

Figure 10:
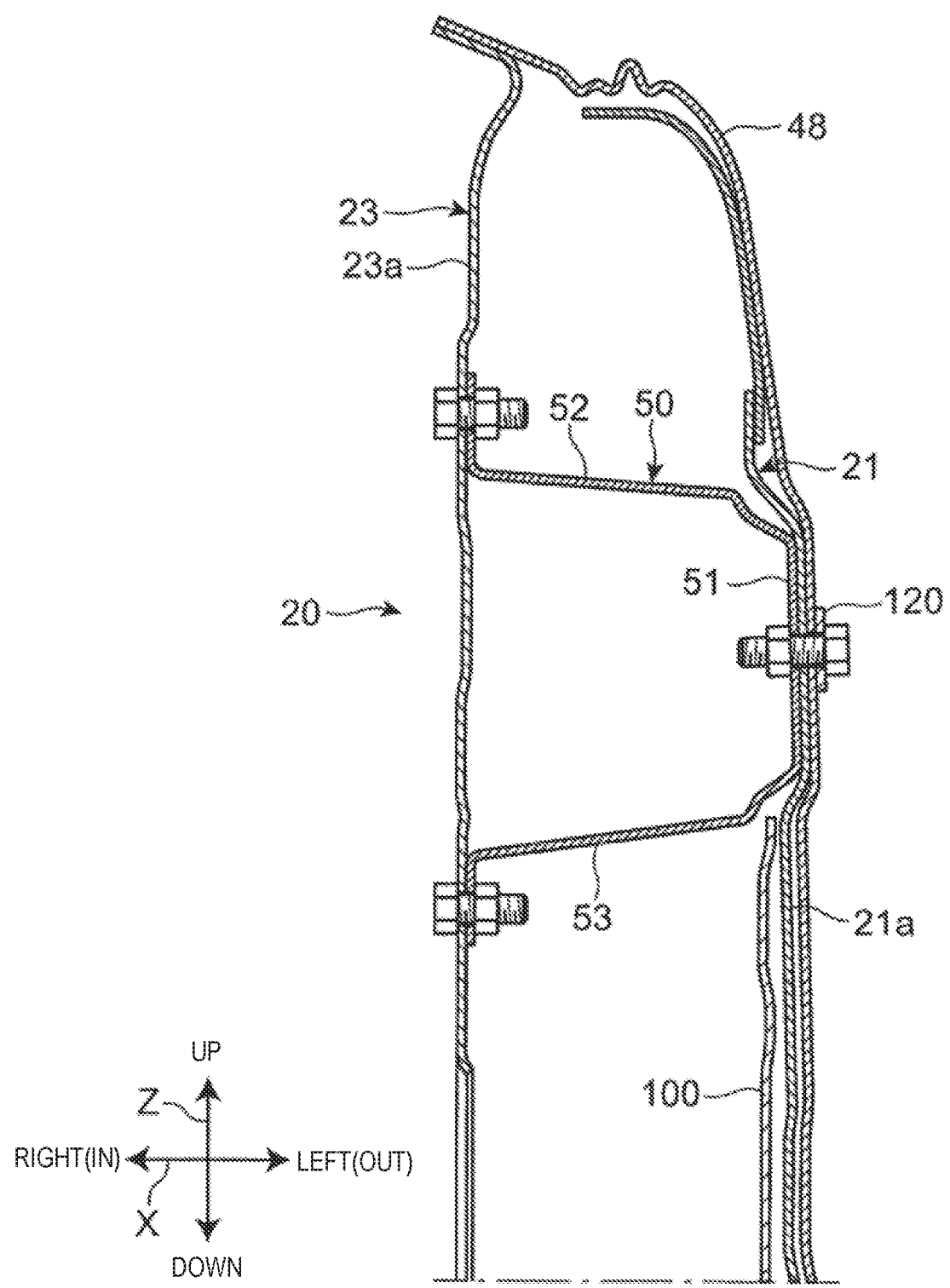
FIG. 10 is a front cross-sectional view illustrating the inside of the hinge pillar.

As illustrated in FIGS. 4, 5 and 10, the hinge reinforcement 50 includes the base surface part 51 disposed on the concaved portion of the side surface part 21a of the hinge pillar outer 21, an upper surface part 52 extending inwardly from an upper edge of the base surface part 51, and a lower surface part 53 extending inwardly from a lower edge of the base surface part 51. The hinge reinforcement 50, as a whole, has a substantially inwardly opening channel shape or upwardly opening channel shape in the longitudinal directions Y. The upper edge of the base surface part 51 is disposed in or near a joined part between the hinge pillar outer 21 and the front pillar 30. The lower edge of the base surface part 51 is disposed higher than a vertical center of the hinge pillar 20.

Figure 8:
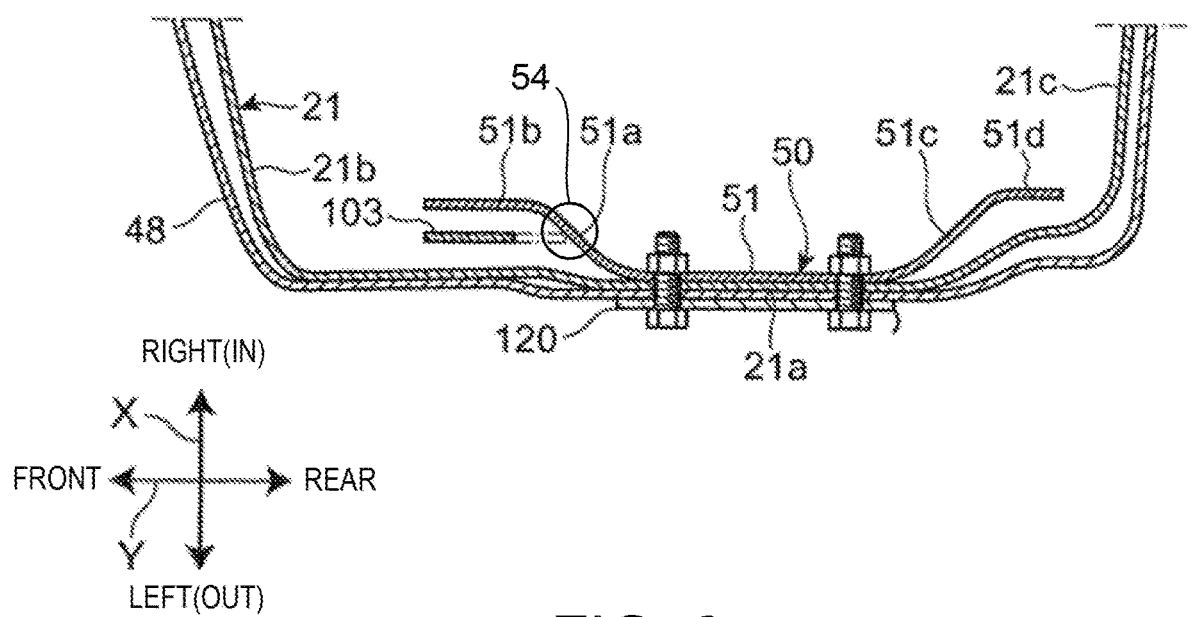
FIG. 8 is a top cross-sectional view illustrating the hinge pillar reinforcement and parts therearound taken along a line A-A of FIG. 4.

As illustrated in FIG. 8, the base surface part 51 of the hinge reinforcement 50 has a front side wall portion 51a extending inwardly from a front edge of the base surface part 51 while inclining forward, and a front edge portion 51b extending forwardly from the front side wall portion 51a. The base surface part 51 further has a rear side wall portion 51c extending inwardly from a rear edge of the base surface part 51 while inclining rearwardly, and a rear edge portion 51d extending rearwardly from the rear side wall portion 51c.

The base surface part 51 of the hinge reinforcement 50 is fixedly joined to the side surface part 21a of the hinge pillar outer 21 by a fastener (bolt, screw, etc.) along with the cabin side outer 48 and the hinge member 120 for the front door (see FIGS. 8 and 10).

As illustrated in FIGS. 5 and 6, the upper surface part 52 of the hinge reinforcement 50 has an inner edge portion 52a provided at an inner end, and front- and rear-side edge portions 52b and 52c provided at both ends in the longitudinal directions Y. Similarly, the lower surface part 53 of the hinge reinforcement 50 has an inner edge portion 53a provided at an inner end, and front- and rear-side edge portions 53b and 53c provided at both ends in the longitudinal directions Y. The inner edge portions 52a and 53a are fixedly joined to the upper hinge pillar inner 23, by fasteners (bolts, screws, etc.), respectively. The front- and rear-side edge portions 52b and 52c of the upper surface part 52 are fixedly joined to the front and rear surface parts 21b and 21c of the hinge pillar outer 21 by, for example, spot welding, respectively. Similarly, the front- and rear-side edge portions 53b and 53c of the lower surface part 53 are fixedly joined to the front and rear surface parts 21b and 21c of the hinge pillar outer 21 by, for example, spot welding, respectively. Although is not illustrated in detail, the joined parts between the front- and rear-side edge portions 52b and 53c to the front and rear surface parts 21c vertically overlap with the joined parts between the front and rear surface parts 21b and 21c and the front pillar 30. In this embodiment, a bolt is used as each fastener.

The hinge reinforcement 50 has an overlapping section 54 located on the rear side of a portion of a hinge pillar reinforcement 100 (described later) and vertically overlapping with the portion. In this embodiment, as illustrated in FIG. 8, the front side wall portion 51a is located on the rear side with respect to an upper end portion 103 of the hinge pillar reinforcement 100 and vertically overlaps with the upper end portion 103.

Hinge Pillar Reinforcement 100

As illustrated in FIGS. 2 and 4 to 7, the hinge pillar reinforcement 100 extending vertically is disposed in the hinge pillar 20. The hinge pillar reinforcement 100 includes a side reinforcing part 101 disposed along an inner surface of the side surface part 21a of the hinge pillar outer 21, and a front reinforcing part 102 disposed along a rear surface of the front surface part 21b of the hinge pillar outer 21. The hinge pillar reinforcement 100 has a higher rigidity than the hinge pillar outer 21.

The side reinforcing part 101 of the hinge pillar reinforcement 100 has the upper end portion 103 and a lower end portion 104. The side reinforcing part 101 is fixedly joined to the side surface part 21a of the hinge pillar outer 21 by, for example, spot welding at a plurality of positions between the upper and lower end portions 103 and 104 in the vertical directions Z. The upper end portion 103 of the side reinforcing part 101 is not fixed to any members including the hinge pillar outer 21, and is spaced inwardly from the side surface part 21a. The lower end portion 104 of the side reinforcing part 101 is fixedly joined to a side sill outer 5 (described later).

Figure 7:
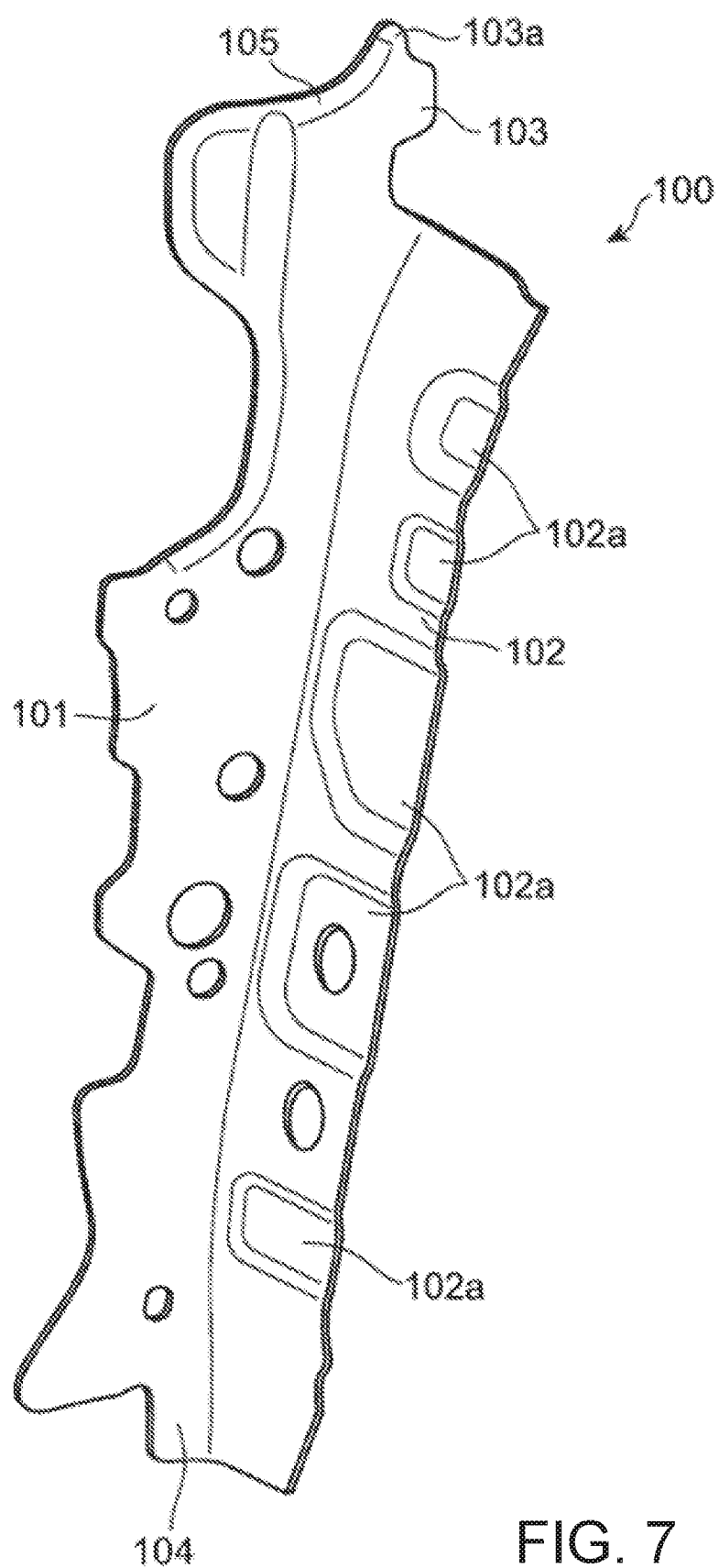
FIG. 7 is a perspective view illustrating a hinge pillar reinforcement.

As illustrated in FIGS. 5 and 7, the upper end portion 103 has a tip end portion 103a extending in the longitudinal directions Y at an upper end. The side reinforcing part 101 is also formed with an arc-shaped portion 105 extending along front and lower edge portions of (the flat part of) the base surface part 51 of the hinge reinforcement 50.

The front reinforcing part 102 of the hinge pillar reinforcement 100 extends inwardly from a front edge of the side reinforcing part 101. A part of the hinge pillar reinforcement 100 where the front reinforcing part 102 is provided in the vertical directions Z has a substantially L-shaped cross section in the vertical directions Z. The front reinforcing part 102 is joined and fixed to the front surface part 21b of the hinge pillar outer 21 by, for example, spot welding at a plurality of positions (joined sections 102a) as illustrated in FIGS. 5 and 7.

The portion of the hinge pillar reinforcement 100 is located on the front side of the overlapping section 54 of the hinge reinforcement 50 and vertically overlaps with the overlapping section 54. In this embodiment, as illustrated in FIG. 8, at least the upper end portion 103 of the hinge pillar reinforcement 100 is located on the front side of the front side wall portion 51a of the hinge reinforcement 50 and vertically overlaps with the upper end portion 103 when viewed from the front side. As described later, when a load is applied from the front side to the part of the hinge pillar outer 21 joined to the hinge pillar reinforcement 100 (hereinafter, this part is referred to as "the reinforced part of the hinge pillar outer 21"), the portion of the hinge pillar reinforcement 100 receives the load and functions as a contacting section for contacting with the hinge reinforcement 50.

Other Structure Inside Hinge Pillar 20

As illustrated in FIGS. 2 and 4 to 6, an outer reinforcement panel 28 is disposed inside the hinge pillar 20. The outer reinforcement panel 28 is entirely disposed on the rear side of the hinge pillar reinforcement 100 and, as illustrated in FIGS. 2 and 11, joined to be fixed to the hinge pillar reinforcement 100 by, for example, spot welding so that the hinge pillar reinforcement 100 overlaps on the outer side. The outer reinforcement panel 28 has a substantially L-shaped cross section and is joined to the side and rear surface parts 21a and 21c of the hinge pillar outer 21. As illustrated in FIG. 4, an upper end of the outer reinforcement panel 28 is located lower than an upper end of the hinge pillar reinforcement 100.

As illustrated in FIG. 1, a lower end part of the outer reinforcement panel 28 protrudes downwardly of a lower end part of the hinge pillar outer 21 and is joined to the side sill outer 5 (described later).

As illustrated in FIG. 6, a reinforcing member 29 is disposed across the internal space of the hinge pillar 20 from the lower and upper hinge pillar inners 22 and 23 to the hinge pillar outer 21. The reinforcing member 29 is formed in a crank shape in the longitudinal directions Y The reinforcing member 29 is joined to the lower end part of the upper hinge pillar inner 23 at an inner edge, and joined to hinge pillar outer 21 via the hinge pillar reinforcement 100 and the outer reinforcement panel 28 at an outer edge. Note that in FIG. 4, the illustration of the reinforcing member 29 is omitted.

As illustrated in FIG. 3, the side surface part 22a of the lower hinge pillar inner 22 is formed with a bend-facilitating portion 90 extending intermittently vertically. The bend-facilitating portion 90 vertically intermittently extends through a rear end of a horizontal bead portion 22g extending in the longitudinal directions Y, upper and lower ends of a first vertical bead portion 22h, and upper and lower ends of a second vertical bead portion 22i.

The horizontal bead portion 22g and the first and second vertical bead portions 22h and 22i bulge outwardly from the side surface part 22a. In the side surface part 22a of the lower hinge pillar inner 22, a stress caused by an impact load applied to the lower hinge pillar inner 22 easily concentrates in the horizontal bead portion 22g and the first and second vertical bead portions 22h and 22i which have high rigidities, and boundary portions between these high rigidity portions and lower rigidity portions therearound.

Thus, when the impact load is applied to the hinge pillar 20 from the front side, a bending deformation of the lower hinge pillar inner 22 such that the bend-facilitating portion 90 where the stress easily concentrates protrudes outwardly is facilitated.

III. Structure Inside Side Sill 4

Side Sill 4

The side sill 4 includes the side sill outer 5 illustrated in FIGS. 4 and 6, having a hat-shaped cross section opening inwardly, and the side sill inner 6 illustrated in FIGS. 2 and 3, having a hat-shaped cross section opening outwardly.

As illustrated in FIGS. 2, 3 and 6, the side sill inner 6 includes a side surface part 6a constituting an inner surface of the side sill 4, an upper surface part 6b extending outwardly from an upper edge of the side surface part 6a and constituting an upper surface of the side sill 4, a lower surface part 6c extending outwardly from a lower edge of the side surface part 6a and constituting a lower surface of the side sill 4, an upper flange 6d extending upwardly from an outer edge of the upper surface part 6b, and a lower flange 6e extending downwardly from an outer edge of the lower surface part 6c.

As illustrated in FIG. 4, the side sill outer 5 includes a side surface part 5a constituting an outer surface of the side sill 4, an upper surface part 5b extending inwardly from an upper edge of the side surface part 5a and constituting the upper surface of the side sill 4, a lower surface part 5c extending inwardly from a lower edge of the side surface part 5a and constituting the lower surface of the side sill 4, an upper flange 5d extending upwardly from an inner edge of the upper surface part 5b, and a lower flange 5e extending downwardly from an inner edge of the lower surface part 5c.

The side sill outer 5 is disposed on the outer side of the side sill inner 6, opposing thereto. The side sill outer 5 is joined to the side sill inner 6 by joining the upper flanges 5d and 6d, and joining the lower flanges 5e and 6e by spot welding, for example.

Thus, a closed section space S2 is formed continuously in the longitudinal directions Y between the side sill outer 5 and the side sill inner 6 (see FIG. 15C). Hereinafter, this closed section space is referred to as "the closed section space S2 of the side sill 4."

The side sill outer 5 protrudes forwardly of the side sill inner 6. A front end of the side sill outer 5 is located on the front side of the rear edge of the hinge pillar 20, for example, between the front surface part 21b and the rear surface part 21c of the hinge pillar outer 21 in the longitudinal directions Y. In other words, the front end of the side sill outer 5 is disposed in the connecting part between the hinge pillar 20 and the side sill 4.

As illustrated in FIG. 6, a front end part of the side sill outer 5 is located on the inner side of the side surface part 21a of the hinge pillar outer 21 and on the outer side of the side surface part 22a of the lower hinge pillar inner 22. In other words, the front end part of the side sill outer 5 is disposed below the internal space of the hinge pillar 20. The lower end portion 104 of the hinge pillar reinforcement 100 (see FIG. 7 etc.), the lower end part of the outer reinforcement member 28, and a lower end portion of the side surface part 21a of the hinge pillar outer 21 are stacked on each other and joined to an outer surface of the side surface part 5a of the side sill outer 5 in the lateral directions X.

Note that as illustrated in FIG. 1, a reinforcing member 7 joined to outer surfaces of the hinge pillar outer 21 and the side sill outer 5 is disposed in the joined part between the front end part of the side sill 4 and the lower end part of the hinge pillar 20. The reinforcing member 7 extends longitudinally, and a front end portion of the reinforcing member 7 extends forwardly while curving upwardly along the curved corner 42 of the door opening 40.

As illustrated in FIGS. 6 and 15A, the lower flange 5e of the side sill outer 5 is joined to the first flange 22d of the lower hinge pillar inner 22 by, for example, spot welding, on the front side of the rear edge of the hinge pillar 20. The upper flange 5d of the side sill outer 5 is not joined to either one of the lower hinge pillar inner 22 and the hinge pillar outer 21. In other words, the side sill outer 5 does not form a closed section space on the front side of the rear edge of the hinge pillar 20, and the closed section space S2 of the side sill 4 is only formed on the rear side of the hinge pillar 20.

Other Structure Inside Side Sill 4

As illustrated in FIG. 4, an inner surface of the side sill outer 5 is joined to a side sill outer reinforcing member 8 extending longitudinally. The side sill outer reinforcing member 8 includes a side surface reinforcing part 8*a* joined to the side surface part 5*a* of the side sill outer 5, an upper surface reinforcing part 8*b* joined to the upper surface part 5*b* of the side sill outer 5, and a lower surface reinforcing part 8*c* joined to the lower surface part 5*c* of the side sill outer 5. The side sill outer reinforcing member 8, as a whole, has a substantially channel-shaped cross section in the longitudinal directions Y.

A front end portion of the upper surface reinforcing part 8*b* of the side sill outer reinforcing member 8 is provided with a flange 8*d* extending upwardly from an inner edge. The flange 8*d* is joined to the upper flange 5*d* of the side sill outer 5.

IV. Connecting Part Between Hinge Pillar 20 and Side Sill 4

As illustrated in FIGS. 2 and 3, a first inner reinforcement 60, a second inner reinforcement 70, and a third inner reinforcement 80 which extend longitudinally are disposed in the connecting part between the lower end part of the hinge pillar 20 and the front end part of the side sill 4.

The first to third inner reinforcements 60 to 80 have higher rigidities than the lower hinge pillar inner 22 and the side sill inner 6. The first inner reinforcement 60 has a higher rigidity than the second and third inner reinforcements 70 and 80.

Figure 12:
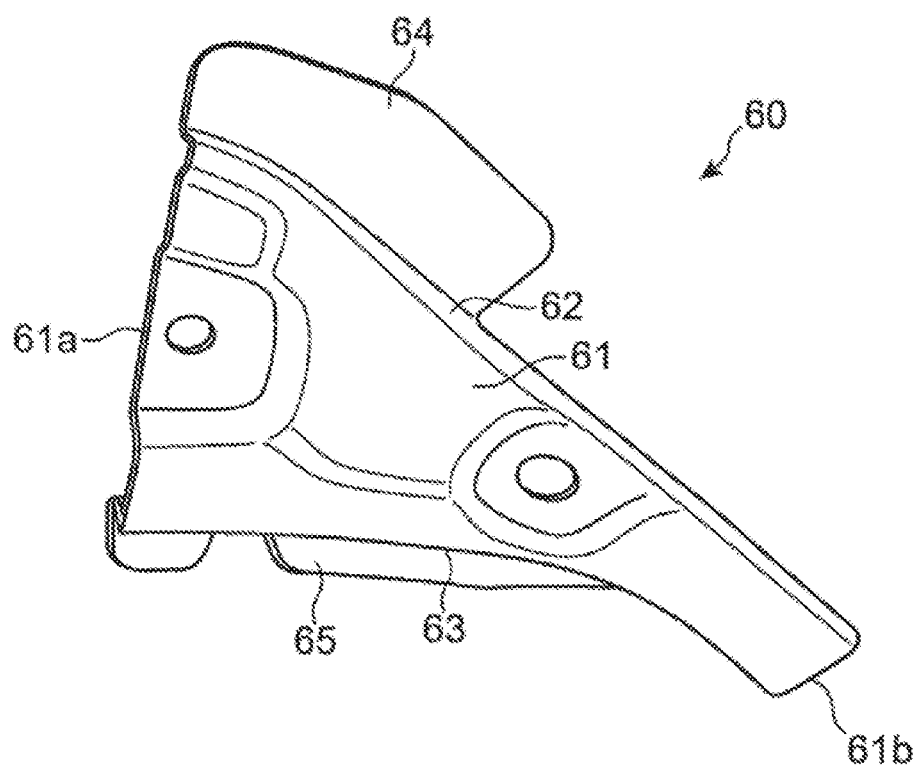
FIG. 12 is a perspective view illustrating a first inner reinforcement.

As illustrated in FIGS. 3, 12 and 15A, the first inner reinforcement 60 has a hat-shaped cross section and is joined to an outer surface of the side surface part 22*a* of the lower hinge pillar inner 22.

The first inner reinforcement 60 includes a first side surface part 61 opposing the outer side of the side surface part 22*a*, an upper surface part 62 extending inwardly from an upper edge of the first side surface part 61, a lower surface part 63 extending inwardly from a lower edge of the first side surface part 61, an upper flange 64 extending upwardly from an inner edge of the upper surface part 62, and a lower flange 65 extending downwardly from an inner edge of the lower surface part 63.

The first side surface part 61 is formed to have a vertical dimension that increases toward the front side as compared to the rear side. The first side surface part 61 is arranged to incline so that a lower end on a front end portion 61*a* is located higher than an upper end of a rear end portion 61*b*.

The front end portion 61*a* of the first side surface part 61 is located higher than the upper surface part 6*b* of the side sill inner 6. Although the front end portion 61*a* of the first side surface part 61 of this embodiment is entirely located higher than the upper surface part 6*b* of the side sill inner 6, the front end portion 61*a* of the first side surface part 61 may be located higher than the upper surface part 6*b* of the side sill inner 6 only partially.

The upper flange 64 extends from a front end to a center portion of the upper surface part 62 and is joined to the side surface part 22*a* of the lower hinge pillar inner 22. The lower flange 65 is joined to the side surface part 22*a* of the lower hinge pillar inner 22 via a flange 73 (described later) of the second inner reinforcement 70.

Figure 13:
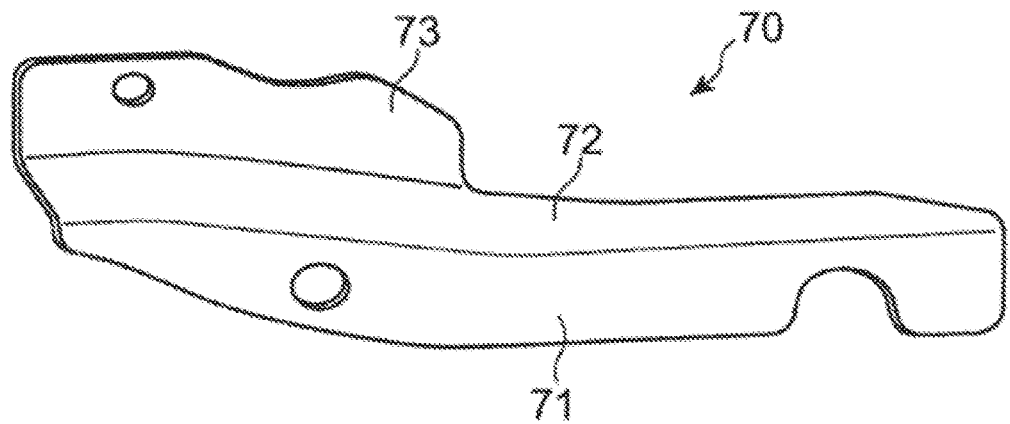
FIG. 13 is a perspective view illustrating a second inner reinforcement.

As illustrated in FIGS. 3 and 13, the second inner reinforcement 70 includes a second side surface part 71 opposing the outer side of the side surface part 22*a* of the lower hinge pillar inner 22, an upper surface part 72 extending inwardly from an upper edge of the second side surface part 71, and the flange 73 extending upwardly from an inner edge of the upper surface part 72.

The second side surface part 71 entirely extends longitudinally. The second side surface part 71 and the first side surface part 61 are disposed substantially in a single plane.

The flange 73 of the second inner reinforcement 70 extends from a front end to a center portion of the upper surface part 72 and is joined to the side surface part 22*a* of the lower hinge pillar inner 22 along with the lower flange 65 of the first inner reinforcement 60.

Figure 14:
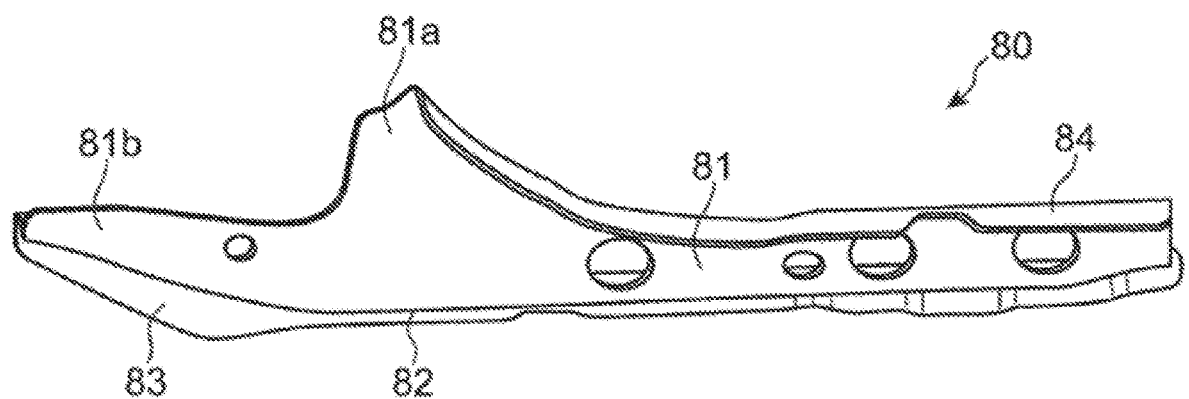
FIG. 14 is a perspective view illustrating a third inner reinforcement.

As illustrated in FIGS. 3 and 14, the third inner reinforcement 80 includes a third side surface part 81 opposing the outer side of the side surface part 22*a* of the lower hinge pillar inner 22, a lower surface part 82 extending inwardly from a lower edge of the third side surface part 81, a lower flange 83 extending downwardly from an inner edge of the lower surface part 82, and an upper flange 84 extending outwardly from an upper edge of the third side surface part 81.

The third side surface part 81 has a base portion 81*a* extending longitudinally along the second side surface part 71, and an upper elongated portion 81*b* extending upwardly from the rear side of a front end. The base portion 81*a* is joined to the second side surface part 71, for example, an outer surface of the second side surface part 71. The upper elongated portion 81*b* is joined to the first side surface part 61, for example, an outer surface of the first side surface part 61.

The base portion 81*a* protrudes rearwardly of a rear end of the second side surface part 71, and a rear end of the base portion 81*a* is disposed on the rear side of the front end of the side sill inner 6. In the first side surface part 61, the upper elongated portion 81*b* is joined to a position on the rear side of a center in the longitudinal directions Y.

The lower surface part 82 of the third inner reinforcement 80 is disposed opposing the lower side of the upper surface part 72 of the second inner reinforcement 70. On the rear side of the rear end of the second inner reinforcement 70, the lower surface part 82 is disposed further opposing the lower side of the upper surface part 22*c* corresponding to the rear elongated structure 22C of the lower hinge pillar inner 22, and the upper surface part 6*b* of the side sill inner 6.

The lower flange 83 of the third inner reinforcement 80 is joined to the side surface part 22*a* of the lower hinge pillar inner 22 at a front end portion, and joined to the side surface part 6*a* of the side sill inner 6 at a rear end portion.

The upper flange 84 of the third inner reinforcement 80 is disposed along a lower surface of the upper surface portion 22*c* corresponding to the rear elongated portion 22C of the lower hinge pillar inner 22 and a lower surface of the upper surface part 6*b* of the side sill inner 6, and is joined to these surfaces.

As illustrated in FIG. 15A, the closed section space component is formed with the first and second closed section spaces S3 and S4 continuously in the longitudinal directions Y, and the frontal impact load applied to the hinge pillar 20 is transmittable to the rear side by the first and second closed section spaces S3 and S4. The first and second closed section spaces S3 and S4 are disposed vertically.

The first closed section space S3 is formed between the lower hinge pillar inner 22 and the first inner reinforcement 60. A vertical dimension of the first closed section space S3 increases toward the front side. A lateral dimension of the first closed section space S3 is substantially fixed and a cross-sectional area of the first closed section space S3 increases toward the front side compared to the rear side.

The first closed section space S3 at the front end where the vertical dimension becomes largest is capable of receiving the frontal impact load in a vertically wide area. Therefore, a stress applied to a front end part of the first inner reinforcement 60 due to the frontal impact load is distributed, thus the shape of the first closed section space S3 is sufficiently maintained and a rearward load transmission via the first closed section space S3 is effectively achieved.

As illustrated in FIG. 3, a corner Cl of the first closed section space S3 between the first side and upper surface parts 61 and 62 of the first inner reinforcement 60 forms a substantially straight ridge line L1 extending obliquely downwardly as it extends rearwardly.

As illustrated in FIG. 3, this ridge line L1 extends to be longitudinally continuous to a substantially straight line L2 formed by the upper surface part 22c corresponding to the rear elongated portion 22C of the lower hinge pillar inner 22 and the upper surface part 6b of the side sill inner 6 in a side view of the vehicle body, via a curved line L3 formed by the portion of the upper surface part 22c constituting the curve structure 22B.

As illustrated in FIG. 15A, the second closed section space S4 is disposed on the lower side of the first closed section space S3 to be spaced apart therefrom. The second closed section space S4 is formed inside a space defined by the lower hinge pillar inner 22 and the second and third inner reinforcements 70 and 80.

A vertical dimension, a lateral dimension, and a cross-sectional area of the second closed section space S4 are substantially fixed over the entire longitudinal length. Therefore, a total vertical dimension and a total cross-sectional area of the first and second closed section spaces S3 and S4 increase toward the front side compared to the rear side.

As illustrated in FIG. 15B, the third side surface part 81 of the third inner reinforcement 80 is joined to the first side surface part 61 of the first inner reinforcement 60 on the outer side of the first closed section space S3, and joined to the second side surface part 71 of the second inner reinforcement 70 on the outer side of the second closed section space S4. Therefore, on the rear side of rear ends of the first and second closed section spaces S3 and S4, a single converged closed section space S5 is formed between the lower hinge pillar inner 22 and the third inner reinforcement 80. Thus, rear end sides of the first and second closed section spaces S3 and S4 are converged into the single converged closed section space S5 at the rear end sides.

This converged closed section space S5 is formed using the third side surface part 81 joined to the outer side of the first side surface part 61 constituting the first closed section space S3 and the outer side of the second closed section surface part 71 constituting the second closed section space S4. Therefore, the rear end sides of the first and second closed section spaces S3 and S4 are easily converged into the converged closed section space S5.

The converged closed section space S5 is formed longitudinally continuously. A front end section of the converged closed section space S5 overlaps, in the longitudinal directions Y, with the portion of the upper surface part 22c of the lower hinge pillar inner 22 constituting the curve structure 22B (see the line D-D of FIG. 3). A rear end section of the converged closed section space S5 is disposed on the rear side of the front end of the side sill inner 6 (see the line E-E of FIG. 3).

The converged closed section space component forming the converged closed section space S5 is comprised of the third side surface part 81 and the lower surface part 82 of the third inner reinforcement 80, the side surface part 22a and the upper surface part 22c of the lower hinge pillar inner 22, and the side surface part 6a and the upper surface part 6b of the side sill inner 6.

In addition to the converged closed section space S5, the side surface part 22a and the upper surface part 22c of the lower hinge pillar inner 22 and the side surface part 6a and the upper surface part 6b of the side sill inner 6 also constitute the closed section space S2 of the side sill 4. Thus, the rear end section of the converged closed section space S5 is formed by using a member also used for the closed section space S2 of the side sill 4, and the rear end section of the converged closed section space S5 is connected to the closed section space S2 of the side sill 4.

V. Operations and Effects

With the above structures, the frontal impact load applied to the reinforced part of the hinge pillar outer 21 (the part of the hinge pillar outer 21 where the hinge pillar reinforcement 100 is joined in the vertical directions) is effectively distributed rearwardly via the front pillar 30, the impact bar 110, and the side sill as described below.

First, a case where a small overlap collision occurs and an impact load is applied to the hinge pillar 20 from the front side or an obliquely front (and outer) side is described.

In vehicles recently discussed or put in use, a front wheel may be facilitated to move rearwardly (retreats) while sliding outwardly in order to reduce an impact load applied to the hinge pillar 20 from a collision object on the front side via the front wheel. When a small overlap collision of the vehicle with such kind of a side body structure occurs, the impact load is applied to the hinge pillar 20 from the front side or the obliquely front side via the rearwardly and outwardly retreated front wheel.

When the front wheel retreats obliquely outwardly as described above, a front-wheel-side suspension member (not illustrated) coupled to the front wheel and extending vertically retreats obliquely outwardly along with the front wheel while collapsing down, and is disengaged from a vehicle-body-side suspension member during the retreating process.

Additionally, if a tire of the front wheel sandwiched by the hinge pillar 20 and the collision object becomes flat, the front-wheel-side suspension member which continues to retreat obliquely outwardly comes into contact with the hinge pillar 20, and thus another collision occurs between the collision object and the hinge pillar 20 via the suspension member.

In such a collision mode, the retreating suspension member comes into contact with the hinge pillar 20 at an outwardly offset position with respect to a center thereof in the vehicle width directions, and the impact load may be applied to the hinge pillar 20 at this position from the front side or the obliquely front side.

For example, when the impact load applied to the hinge pillar 20 from the front side or the obliquely front side is applied to the reinforced part of the hinge pillar outer 21, since the hinge pillar reinforcement 100 is disposed on the side and front surface parts 21a and 21b of the hinge pillar outer 21 and the rigidities are increased, the bending of the hinge pillar 20 due to the impact load is reduced. On the other hand, when a high impact load is applied from the front side to an upper part of the hinge pillar 20, for example, a position close to a lower edge part of the hinge reinforcement 50, a moment generated by the impact load acts at least on the hinge pillar outer 21 (and the corresponding part of the lower hinge pillar inner 22) and the hinge pillar reinforcement 100 to collapses rearwardly together.

Here, the rigidity of the part of the side and front surface parts 21a and 21b of the hinge pillar outer 21 where the hinge pillar reinforcement 100 is not disposed is not increased, and thus this part does not easily collapse rearwardly. Therefore, even when the hinge pillar outer 21 and the hinge pillar reinforcement 100 start collapsing rearwardly due to the impact load, the part of the hinge pillar outer 21 to which the hinge pillar reinforcement 100 is not joined does not collapse or collapses less. This part of the hinge pillar outer 21 to which the hinge pillar reinforcement 100 is not joined includes the joined portion of the base surface part 51 of the hinge reinforcement 50 to the hinge pillar outer 21.

As a result, as indicated by the two-dotted chain line of FIG. 8, the upper end portion 103 of the hinge pillar reinforcement 100 is displaced rearwardly in relation to the base surface part 51 of the hinge reinforcement 50, in other words, is displaced toward the front side wall portion 51a of the hinge reinforcement 50. At least the tip end portion 103a of the upper end portion 103 contacts or is engaged with one of the front side wall portion 51a and a portion therearound. Thus, the hinge reinforcement 50 functions as the support of the hinge pillar 20 and the hinge pillar reinforcement 100, and the hinge pillar 20 is prevented from collapsing further rearwardly.

The contact between the hinge pillar reinforcement 100 and the one of the front side wall portion 51a and the portion therearound allows the impact load to be transmitted from the hinge pillar 20 to the front side wall portion 51a of the hinge reinforcement 50 via the hinge pillar reinforcement 100, and then to the base surface part 51. The impact load transmitted to the base surface part 51 of the hinge reinforcement 50 is further transmitted to the front pillar 30 via the hinge pillar outer 21 to which the base surface part 51 is joined, and also via the upper surface part 52 of the hinge reinforcement 50 and the upper hinge pillar inner 23 to which the upper part 52 is joined. Then the impact load is further transmitted rearwardly.

The impact load received by the base surface part 51 is transmitted to the hinge unit provided on the outer side of the hinge pillar outer 21 to which the base surface part 51 is joined, is transmitted to the front end part 111 of the impact bar 110 located in the rear end part of the hinge unit, and is further transmitted rearwardly from the rear end part 112 of the impact bar 110.

The impact load transmitted from the hinge pillar outer 21 to the hinge pillar reinforcement 100 is transmitted to the side sill outer 5 of the side sill 4 joined to the lower end portion 104 of the hinge pillar reinforcement 100. Then the impact load is further transmitted rearwardly.

Moreover, as described below, the impact load applied to the hinge pillar 20 from the front side is transmitted to the side sill 4, not only via the hinge pillar outer 21, but also via the lower hinge pillar inner 22.

As described above, the connecting part between the lower end part of the hinge pillar 20 and the front end part of the side sill 4 is formed with the first and second closed section spaces S3 and S4 and the converged closed section space S5 extending in the longitudinal directions Y. Therefore, the impact load applied to the lower end part of the hinge pillar 20 from the front side is partially transmitted to the first and second closed section spaces S3 and S4, and is further transmitted to the closed section space S2 of the side sill 4 via the converged closed section space S5 smoothly.

Therefore, the rearward load distribution via the side sill 4 is effectively achieved. Especially since the impact load applied to the part of the hinge pillar 20 higher than the side sill 4 is received in a front end section of the first closed section space S3 and transmitted to the closed section space S2 of the side sill 4, the stress concentration in the curved corner 42 of the door opening 40 is lessened and the generation of moment acting rearwardly to cause the hinge pillar 20 to collapse is reduced more effectively, and thus a deformation of a cabin is reduced.

As illustrated in FIG. 3, the bend-facilitating portion 90 formed in the side surface part 22a of the lower hinge pillar inner 22 described above is adjacently disposed on the front side of the front end part of the first inner reinforcement 60. Further, the bend-facilitating portion 90 is disposed along the front end part of the first inner reinforcement 60 in the vehicle side view.

Thus, when the frontal impact load is applied to the hinge pillar 20, the bending deformation occurs by the bend-facilitating portion 90 protruding outwardly as described above, which causes the front end parts of the first to third inner reinforcements 60 to 80 adjacently disposed on the rear side of the bend-facilitating portion 90, to be displaced outwardly.

As a result, when the frontal impact load is obliquely applied from the outer side to the hinge pillar 20, the impact load is easily applied to the first and second closed section spaces S3 and S4 formed on the inner side. Here, since each of the front end parts of the first inner reinforcements 60 disposed along the bend-facilitating portion 90 in the vehicle side view is entirely uniformly displaced outwardly, the frontal impact load obliquely applied from the outer side is easily and evenly applied to the entire front end part of the first inner reinforcement 60. This effect becomes particularly obvious when the impact load is high and a part of the hinge pillar reinforcement 100 moves into the front side of the first to third inner reinforcements 60 to 80.

As a result, the front impact load applied to the hinge pillar 20 obliquely from the outer side is also effectively transmitted to the closed section space S2 of the side sill 4 via the first and second closed section space S3 and S4 and the converged closed section space S5, and the rearward load distribution is effectively achieved.

According to this embodiment, by using the hinge pillar reinforcement 100 capable of reducing the bending of the hinge pillar 20, the cabin deformation due to the hinge pillar 20 collapsing is reduced while distributing the front impact load effectively rearwardly applied to the reinforced part of the hinge pillar 20 via the front pillar 30, the impact bar 110, and the side sill 4.

VI. Modification

Although the embodiment is described above as an example of the present invention, the present invention is not limited to this embodiment and has various modifications.

Figure 9:
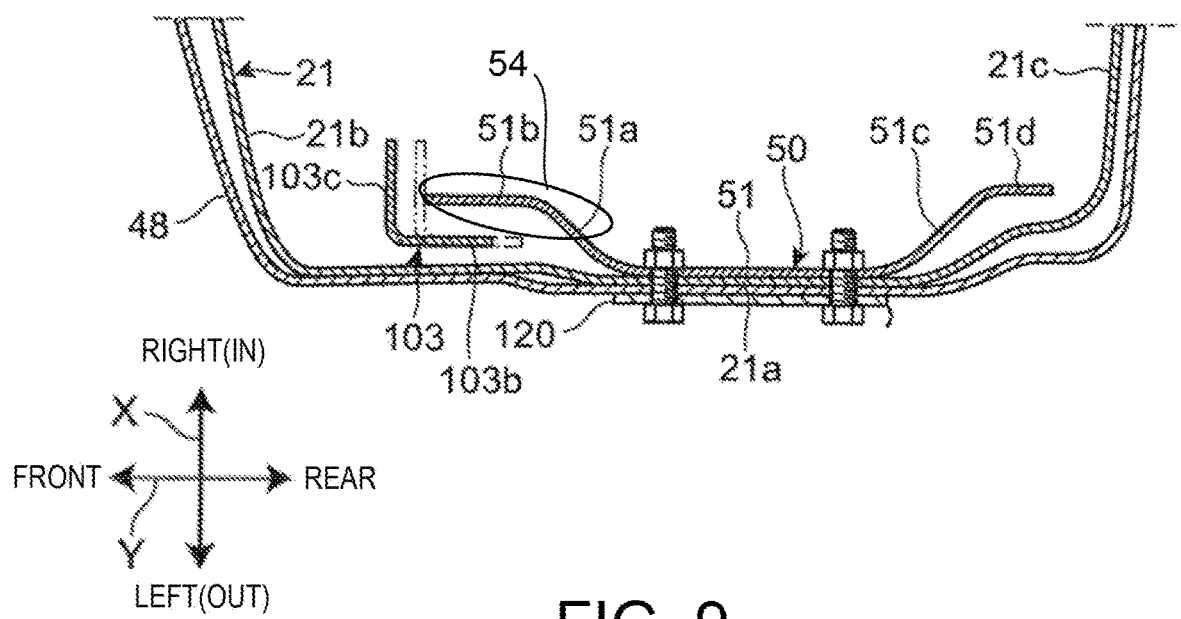
FIG. 9 is a view corresponding to FIG. 8 in a modification of the present invention.

In the above embodiment, the example in which when the frontal impact load is applied to the reinforced part of the hinge pillar outer 21, the upper end portion 103 of the hinge pillar reinforcement 100 illustrated in FIG. 8 contacts with one of the front side wall portion 51a and the portion therearound is described; however, as illustrated in FIG. 9, an extended portion 103c extending inwardly from a base portion 103b of the upper end portion 103 of the hinge pillar reinforcement 100 may be provided.

Here, as illustrated in FIG. 9, the front edge portion 51b provided to the base surface part 51 is located on the rear side of the extended portion 103c of the upper end portion 103 and vertically overlaps with the upper end portion 103 when viewed from the front side. Therefore, when the frontal impact load is applied to the reinforced part of the hinge pillar outer 21, the effect described above is exerted, and as indicated by the two-dotted chain line of FIG. 9, the extended portion 103c of the hinge pillar reinforcement 100 contacts with the front edge portion 51b of the hinge reinforcement 50.

As is apparent from FIG. 9, an adjustment of the upper end portion 103 of the hinge pillar reinforcement 100 in position and/or size allows the contact between the extended portion 103c of the upper end portion 103 of the hinge pillar reinforcement 100 and the front edge portion 51b of the hinge reinforcement 50 to occur simultaneously or substantially simultaneously to the contact between the base portion 103b of the upper end portion 103 of the hinge pillar reinforcement 100 and the front edge portion 51b of the hinge reinforcement 50. In this modification, the hinge pillar reinforcement 100 contacts with the hinge reinforcement 50 more surely and the impact load is effectively transmitted rearwardly via the front pillar 30, the impact bar 110, and the side sill 4. Moreover, since the hinge pillar reinforcement 100 is supported by both the front side wall portion 51a and the front edge portion 51b of the hinge reinforcement 50, the function of the hinge reinforcement 50 as the support for the hinge pillar reinforcement 100 collapsing rearwardly is enhanced.

As described above, according to the present invention, the cabin deformation due to the hinge pillar collapsing is reduced while the frontal impact load applied to the hinge pillar is effectively distributed rearwardly by using the reinforcing member capable of reducing the bending of the hinge pillar. Therefore, it is possible to suitably use the present invention in the industrial fields of manufacturing automobiles with hinge pillars.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automobile
2 Floor Panel
4 Side Sill
5 Side Sill Outer
6 Side Sill Inner
7 Reinforcing Member
20 Hinge Pillar
21 Hinge Pillar Outer
22 Lower Hinge Pillar Inner
23 Upper Hinge Pillar Inner
28 Outer Reinforcement Panel
30 Front Pillar
38 Center Pillar
40 Door Opening
48 Cabin Side Outer
50 Hinge Reinforcement
51 Base Surface Part
51a Front Side Wall Portion (Side Wall Part)
51b Front Edge Portion (Edge Part)
60 First Inner Reinforcement
70 Second Inner Reinforcement
80 Third Inner Reinforcement
100 Hinge Pillar Reinforcement (Reinforcing Member)
101 Side Reinforcing Part
102 Front Reinforcing Part
103 Upper End Portion
S1 Closed Section Space of Hinge Pillar
S2 Closed Section Space of Side Sill
S3 First Closed Section Space
S4 Second Closed Section Space
S5 Converged Closed Section Space

What is claimed is:

1. A side body structure of a vehicle, comprising:
a hinge pillar extending in vertical directions of the vehicle;
a hinge reinforcement disposed in the hinge pillar; and
a reinforcing member fixed to the hinge pillar at a lower side of a door hinge attachment part and extending in the vertical directions,
wherein the hinge reinforcement is provided with an overlapping section provided on a rear side of an upper end part of the reinforcing member and overlapping in the vertical directions with the upper end part when viewed from a vehicle front side,
wherein the hinge reinforcement has a base surface part fixed to the hinge pillar and a side wall part extending inwardly in width directions of the vehicle from the base surface part,
wherein the overlapping section includes the side wall part,
wherein a hinge member is attached to the door hinge attachment part of the hinge pillar,
wherein a cabin side outer part is provided on an outer side of the hinge pillar,
wherein the hinge pillar includes a hinge pillar outer part disposed on an outer side of an upper hinge pillar inner part constituting an inner member of the hinge pillar,
wherein the hinge reinforcement is disposed at an upper side of the door hinge attachment part,
wherein a front side wall portion of the hinge reinforcement is spaced apart from a front surface part of the hinge pillar in a rear direction of the vehicle,
wherein the door hinge attachment part of the hinge pillar comprises the cabin side outer part, the hinge pillar outer part, the hinge reinforcement, and the upper hinge pillar inner part layered in this order from an outside of the vehicle toward an inside of the vehicle,
wherein the hinge member is fixed to the cabin side outer part, the hinge pillar outer part, and the hinge reinforcement via a fastener, and
wherein the upper end part extends from a lower side of the reinforcing member in an upward direction toward a space between the front surface part of the hinge pillar outer part and the front side wall portion of the hinge reinforcement, the upper end part not fixed to the hinge pillar, such that the upper end part is spaced apart from the front surface part and the front side wall portion.

2. The side body structure of claim 1, further comprising a side sill extending in longitudinal directions of the vehicle and connected to the hinge pillar,
wherein the reinforcing member is partially fixed to the side sill.

3. The side body structure of claim 1, wherein
the hinge reinforcement has an edge part extending forwardly from one end of the side wall part on an inner side in the width directions, and
the overlapping section includes the edge part.

4. The side body structure of claim 3, further comprising a side sill extending in longitudinal directions of the vehicle and connected to the hinge pillar,
wherein the reinforcing member is partially fixed to the side sill.

* * * * *